United States Patent [19]
Billigmeier et al.

[11] 3,892,785

[45] July 1, 1975

[54] CROSS-LINKABLE POLYAMIDES DERIVED FROM POLYMERIC FAT ACIDS

[75] Inventors: James E. Billigmeier, Rancho Cordova, Calif.; Allan L. Melby, Anoka; Dwight E. Peerman, Minneapolis; Richard R. Roesler, New Brighton, all of Minn.

[73] Assignee: General Mills, Inc., Minneapolis, Minn.

[22] Filed: Nov. 9, 1972

[21] Appl. No.: 305,020

[52] U.S. Cl. ........... 260/404.5; 260/72 N; 106/287; 156/331; 161/227
[51] Int. Cl. .......................................... C07c 103/30
[58] Field of Search ............. 260/404.5, 18 N, 72 N

[56] References Cited
UNITED STATES PATENTS

| | | | |
|---|---|---|---|
| 2,361,185 | 10/1944 | Engelmann et al. | 260/404.5 X |
| 2,412,993 | 12/1946 | Larchar et al. | 260/72 N X |
| 2,430,866 | 11/1947 | Foster et al. | 260/72 N X |
| 2,443,450 | 6/1948 | Graham et al. | 260/72 N X |
| 2,448,125 | 8/1948 | Sallmann et al. | 260/404.5 X |
| 2,542,288 | 2/1951 | Pickens | 260/72 N X |
| 2,643,227 | 6/1953 | Hughes et al. | 260/404.5 X |
| 3,255,147 | 6/1966 | Krueger et al. | 260/21 X |
| 3,306,953 | 2/1967 | Fourcade | 260/18 N X |
| 3,399,153 | 8/1968 | Sekmakas et al. | 260/21 |
| 3,471,466 | 10/1969 | Hayes | 260/404.5 X |
| 3,499,853 | 3/1970 | Griebsch et al. | 260/404.5 X |

*Primary Examiner*—Lewis Gotts
*Assistant Examiner*—Ethel G. Love
*Attorney, Agent, or Firm*—Gene O. Enockson

[57] ABSTRACT

Cross-linkable polyamides derived from an essentially linear diamine-polymeric fat acid based polyamide wherein the polymeric fat acid comprises at least about 25 equivalent % of the acid component of the polyamide and contains at least about 85% dimeric fat acid, said cross-linkable polyamide having sufficient $-CH_2-O-R''$ groups as replacements for amide hydrogens of the essentially linear polyamide to render the same cross-linkable. Bonding of fabric with the cross-linkable polyamides and coating and bonding of a variety of other substrates with such products.

17 Claims, No Drawings

CROSS-LINKABLE POLYAMIDES DERIVED FROM POLYMERIC FAT ACIDS

The present invention relates to cross-linkable polyamides derived from polymerized fat acids. More particularly, it relates to polymeric fat acid based polyamides rendered cross-linkable by the addition of —CH$_2$—O—R'' groups. The invention especially relates to such polyamide derivatives which exhibit tack and to the use of said tacky polymers as fabric bonding materials.

One of the more difficult sewing operations in the construction of clothing is the installation of zippers. The installation is usually completed in two steps. First, the zipper is temporarily positioned by basting (hand sewing) and then finally machine sewn if alignment is correct. Often, however, the average sewer obtains an improper alignment and must rip out and reinstall the zipper. Sometimes, probably through frustration, the average sewer accepts an imperfectly installed zipper.

One attempted solution to the above problem has been the production of a pressure sensitive adhesive tape to be used as a substitute for basting to temporarily hold the zipper in place while it is attached by sewing. After the zipper has been sewn in place, the adhesive tape is removed (removal is difficult because the sewing thread sometimes overlaps and fastens the adhesive tape). Moreover, the zipper still has a chance to shift when the garment is run through the sewing machine and a sewing operation is required (additionally the adhesive tape has to be removed).

More recently, improved thermoplastic resins have been developed for the bonding of fabrics generally. Such resins have been used for zipper in-letting. Thus a thin film of the thermoplastic resin can be used in conjunction with the zipper and the zipper can be temporarily attached with iron basting (i.e. the thermoplastic resin is partially melted in place by the light touch of a steaming flat iron). If the alignment is perfect or adequate, the final bonding is done, if not, the bond is pulled apart, and the materials repositioned and re-basted. When alignment is correct, the final bond is made by heavy pressure for extended times from the steaming iron. Since the garment is essentially stationary throughout the handling procedure, the zipper does not shift during the final step.

In the latter described procedure using a thermoplastic resin, easy application and correction of the temporary bond would be highly desirable. The temporary iron basting is not all that easy or acceptable (i.e. the iron covers the work area during heat basting so that the alignment is not visible until the iron is removed). Attempts have been made to coat the film of thermoplastic adhesive with a pressure sensitive adhesive. In this way, the iron basting could be replaced with "finger" basting. However, it was found that the pressure sensitive coating decreased laundry and dry cleaning resistance of the resulting fabric bonds. Additionally, the low melting point of the pressure sensitive adhesive caused it to strike through the fabric and cause a visible mark on the outside of the bonded fabric.

In a preferred embodiment of the present invention, we have discovered cross-linkable polyamides derived from polymerized fat acids which are highly useful for fabric bonding and particularly for zipper in-letting. Thus the preferred cross-linkable polyamides of the invention exhibit tack and therefore fabrics can be positioned in respect of each other by the use of finger pressure and no extraneous pressure sensitive adhesive is required. These preferred pressure-sensitive thermosetting polyamides of the invention find particular use for the application of zippers. The cloth portion of the zipper is coated with the polyamide on its outer edges. The zipper can then be inserted into the garment with finger pressure. If the zipper is misaligned, it is easily removed and reinserted correctly. When proper alignment is achieved, heat, such as from a steaming flat iron is applied to cure the polyamide thermosetting adhesive. Once cured, the polymer becomes infusible and insoluble, thus making the bond permanent. With the preferred tacky polyamides of the invention, it is also feasible to temporarily adhere hems (or other seams of a garment) until a later oven (or hot iron) cure could be carried out to make the bonds permanent.

The invention is not limited, however, to the preferred tacky cross-linkable polyamides as generally described hereinabove. Thus cross-linkable polyamides not exhibiting tack are also useful. They can be used to provide permanent bonds for fabrics and other substrates and also as coatings for various substrates. Such coatings exhibit good flexibility.

The cross-linkable polyamides of the invention exhibit good stability. This is due in large measure to the procedure by which they are prepared. Thus they are prepared using anhydrous reactants and solvents thus preventing or essentially inhibiting the formation or —CH$_2$OH groups on the polyamides. The presence of —CH$_2$OH groups tends to reduce stability of the cross-linkable polyamides.

As indicated above, the starting polyamides are derived from polymeric fat acids. Polymeric fat acids are well known and commercially available. One method of preparation of polymeric fat acids can be seen in U.S. Patent 3,157,681.

Typical compositions of commercially available undistilled polymeric fat acids, based on unsaturated C$_{18}$ fat acids (the mixture of acids derived from tall oil) are:

| | |
|---|---|
| C$_{18}$ monobasic or monomeric fat acids ("monomer") | 5–15% by wt. |
| C$_{36}$ dibasic or dimeric fat acids ("dimer") | 60–80% by wt. |
| C$_{54}$ (and higher) polybasic or trimeric fat acids ("trimer") | 10–35% by wt. |

While the foregoing available product is prepared by the polymerization of the mixture of ethylenically unsaturated fatty acids obtained from tall oil, similar polymeric fat acids may be prepared from other ethylenically unsaturated monocarboxylic acids.

The relative ratios of monomer, dimer and trimer in such unfractionated polymeric fat acids are dependent on the nature of the starting material and the conditions of polymerization. For the purposes of this invention, the term "monomeric fat acids" refers to the unpolymerized monomeric acids, the term "dimeric fat acids" refers to the dimer of the fat acids and the term "trimeric fat acids" refers to the residual higher polymeric forms consisting primarily of trimer acids but containing some higher polymeric forms. The term "polymeric fat acids" as used herein is intended to be generic to polymerized acids obtained from the ethylenically unsaturated fat acids and consists of a mixture of monomeric, dimeric and trimeric fat acids.

The polymeric fat acids employed in the present invention are prepared by polymerizing ethylenically unsaturated monobasic carboxylic acids having 16 to 22 carbon atoms or the lower alkyl esters thereof. The preferred aliphatic acids are the mono and polyolefinically unsaturated 18 carbon atom acids. Representative octadecenoic acids are 4-octadecenoic, 5-octadecenoic, 6-octadecenoic (petroselinic), 7-octadecenoic, 8-octadecenoic, cis-9-octadecenoic (oleic), trans-9-octadecenoic (elaidic), 11-octadecenoic (vaccenic), 12-octadecenoic and the like. Representative octadecadienoic acids are 9,12-octadecadienoic (linoleic), 9,11-octadecadienoic, 10,12-octadecadienoic, 12,15-octadecadienoic and the like. Representative octadecatrienoic acids are 9,12,15-octadecatrienoic (linolenic), 6,9,12octadecatrienoic, 9,11,13-octadecatrienoic (eleostearic), 10,12,14-octadecatrienoic (pseudo eleostearic) and the like. A representative 18 carbon atom acid having more than three double bonds is moroctic acid which is indicated to be 4,8,12,15-octadecatetraienoic acid. Representative of the less preferred (not as readily available commercially) acids are: 7-hexadecenoic, 9-hexadecenoic (palmitoleic), 9-eicosenoic (gadoleic), 11-eicosenoic, 6,10,14-hexadecatrienoic (hiragonic), 4,8,12,16-eicosatetraenoic, 4,8,12,15,18-eicosapentanoic (timnodonic), 13-docosenoic (erucic), 11-docosenoic (cetoleic), and the like.

The ethylenically unsaturated acids can be polymerized using known catalytic or non-catalytic polymerization techniques. With the use of heat alone, the monoolefinic acids (or the esters thereof) are polymerized at a very slow rate while the polyolefinic acids (or the esters thereof) are polymerized at a reasonable rate. If the double bonds of the polyolefinic acids are in conjugated positions, the polymerization is more rapid than when they are in the non-conjugated positions. Clay catalysts are commonly used to accelerate the polymerization of the unsaturated acids. Lower temperatures are generally used when a catalyst is employed.

Reference has been made hereinabove to the monomeric, dimeric and trimeric fat acids present in the polymeric fat acids. The amounts of monomeric fat acids (often referred to as monomer), dimeric fat acids (often referred to as dimer), and trimeric or higher polymeric fat acids (often referred to as trimer) present in polymeric fat acids may be determined analytically by conventional gas-liquid chromatography of the corresponding methyl esters. Another method of determination is a micromolecular distillation analytical method. This method is that of R. F. Paschke et al., J. Am. Oil. Chem. Soc., XXXI (No. 1), 5, (1954), wherein the distillation is carried out under high vacuum (below 5 microns) and the monomeric fraction is calculated from the weight of product distilling at 155°C., the dimeric fraction calculated from the distilling between 155°C. and 250°C., and the trimeric (or higher) fraction is calculated based on the residue. Unless otherwise indicated herein, the chromatographic analytical method was employed in the analysis of the polymeric fat acids employed in this invention and all limitations on dimeric fat acid content herein are based on this method. When the gas-liquid chromatographic technique is employed, a portion intermediate between monomeric fat acids and dimeric fat acids is seen, and is termed herein merely as "intermediate," since the exact nature thereof is not fully known. For this reason, the dimeric fat acids value determined by this method is slightly lower than the value determined by the micromolecular distillation method. Generally, the monomeric fat acid content determined by the micromolecular distillation method will be somewhat higher than that of the chromatography method. Because of the difference of the two methods, there will be some variation in the values of the contents of various fat acid fractions. Unfortunately, there is no known simple direct mathematical relationship correlating the value of one technique with the other.

The polymeric fat acid employed to prepare the starting polyamides has a dimeric fat acid content, determined by gas-liquid chromatography of at least about 85% by weight (preferably greater than 90%). Where the initially polymerized fat acids have dimer contents below the above period, they are distilled to yield fractions having the requisite dimer content.

It is preferred that the polymeric fat acids are hydrogenated in order to improve the color thereof. The hydrogenation is accomplished using hydrogen under pressure in the presence of a hydrogenation catalyst. The catalysts generally employed in such hydrogenations are Ni, Co, Pt, Pd, Rh and others of the platinum family. In general, the catalyst is suspended on an inert carrier such as kieselguhr, commonly used with Ni, and carbon, commonly used with platinum family of catalysts.

In the Examples to follow, the polymeric fat acids were those obtained by polymerizing, distilling and hydrogenating the mixture of fat acids derived from tall oil (composed of approximately 40–45% linoleic and 50–55% oleic, such %'s being by weight).

The polymeric fat acid can be used alone in reaction with the diamines to be described in the preparation of the starting polyamides. However, it is often preferred to use a copolymerizing acid which may be an aliphatic, cycloaliphatic, or aromatic dicarboxylic acid. Such acids may be defined generally by the formula

HOOC — R — COOH where R is an aliphatic, cycloaliphatic aromatic hydrocarbon radical containing from 2 to 20 carbon atoms. Illustrative of such acids are adipic, sebacic, suberic, succinic, azelaic, glutaric, phthalic and terephthalic. Preferred such copolymerizing acids are the aliphatic dicarboxylic acids containing 6–12 carbon atoms. It is understood that amide forming derivatives of the polymeric fat acids and the copolymerizing acids can be used in the preparation of the starting polyamides. Thus the alkyl esters of such acids can be employed, the alkyl group containing from 1 to 8 carbon atoms.

The polymeric fat acids contribute 25 to 100 equivalent percent of the total carboxyl groups in the preparation of the starting polyamides, the remaining 75 to 0 equivalent percent being contributed by the copolymerizing diacid reactant. The polymeric fat acid contributes a number of important properties to the ultimately cross-linkable polyamides of the invention. Thus, the cured cross-linkable polyamide has good flexibility which is of importance in coatings and also in fabric bonding since the bonds tend to retain good hand; that is, they do not become excessively rigid with age. Additionally, the polymeric fat acid content of the polyamides lowers the softening point so that the resulting substituted polyamides can be tacky. Also, it increases the solubility so that less powerful solvents than 85% formic acid may be used.

The diamines generally employed in the preparation of the starting polyamides may be aliphatic, cycloaliphatic or aromatic diprimary diamines which can be represented by the formula $$H_2N—R'—NH_2$$

where R' is aliphatic, cycloaliphatic or aromatic hydrocarbon radical having from 2 to 44 carbon atoms. Representative of such diamines are: ethylene diamine, 1,2-diamino propane, 1,2-diamino butane, 1,3-diamino propane, 1,3-diamino butane, tetramethylene diamine, pentamethylene diamine, hexamethylene diamine, decamethylene diamine, octadecamethylene diamine, xylylene diamine, cyclohexylene diamine bis(aminoethyl benzene), bis-(4-aminocyclohexyl)methane, isophorone diamine, dimer diamine (the dimer group being derived from the dimerized fat acids as above described) and the like. Mixtures of diamines can be employed. Where the ultimately prepared cross-linkable polyamide is to be used for fabric bonding, it is preferred that the diamine consists of or contains a substantial proportion of hexamethylene diamine (i.e. at least about 25 equivalent %). Mixtures thereof with a second diamine such as xylylene diamine or isophorone diamine are desirable. For fabric bonding purposes, it is desirable to avoid the use of ethylene diamine since the latter diamine tends to cause reduced molecular weight, presumably due to the formation of cyclic end groups. This tendency can be at least partially overcome by increasing the trimer content of the polymeric fat acid. However, when this is done, the resulting polyamide has a tendency to have an undesirably dark color.

The starting polyamides are prepared from essentially equivalent amounts of acid component and diamine. Thus the starting polyamides are relatively linear and of high molecular weight. Slight excesses of acid or diamine can be employed to control the end groups of the starting polyamides. Especially for the preferred tacky cross-linkable polyamides of the invention, it is desirable that the starting polyamide is essentially or primarily acid terminated. Such termination yields crosslinkable products with increased tack and the rate of the substition reaction is improved.

The starting polyamides are prepared by conventional amidification procedures, which usually include heating at temperatures between 100° and 300°C., preferably 200° to 275°C., for a time sufficient to complete the reaction, usually about 2 to 8 hours and most usually about 4 to 6 hours. The reaction is generally conducted while removing the by-product water of reaction.

A typical heating schedule, which was used in preparing the starting polyamides is as follows: The reactants are added to a reaction vessel and heated under nitrogen with stirring over a 2 hour period to about 200°C. and maintained thereat for one hour. The temperature is then raised to 250°C. and maintained at such temperature for two hours after which vacuum is applied (0.1 mm. Hg.) for an additional two hours at 250°C. The product is then discharged, cooled and recovered.

The following Examples A-K illustrate the preparation of the starting polyamides using the typical procedure set forth above.

EXAMPLES A-K

| Ex. | Reactants | Equivalent Percent Employed | Polyamide Properties End Group Analysis (Meq./Kg.) Acid Value | Amine Value | Ball & Ring Melting Point °C. |
|---|---|---|---|---|---|
| A | Polymeric fat acid | 100 | 40.0 | 26.5 | 121 |
|   | Hexamethylene diamine | 100 | | | |
| B | Polymeric fat acid | 50 | 17.7 | 14.4 | 156 |
|   | Azelaic acid | 50 | | | |
|   | Hexamethylene diamine | 60 | | | |
|   | Xylylene diamine | 40 | | | |
| C | Polymeric fat acid | 50 | 21.4 | 102.4 | 169 |
|   | Azelaic acid | 50 | | | |
|   | Hexamethylene diamine | 60 | | | |
|   | Ethylene diamine | 40 | | | |
| D | Polymeric fat acid | 100 | 10.7 | 65.8 | 170 |
|   | Bis-(4-aminocyclohexyl)methane | 100 | | | |
| E | Polymeric fat acid | 100 | 16.1 | 34.6 | 178 |
|   | Bis-(4-aminophenyl) methane | 100 | | | |
| F | Polymeric fat acid | 30 | 9.5 | 60.0 | 230 |
|   | Sebacic acid | 70 | | | |
|   | Hexamethylene diamine | 100 | | | |
| G | Polymeric fat acid | 45 | 2.4 | 89.9 | 204 |
|   | Sebacic acid | 55 | | | |
|   | Hexamethylene diamine | 100 | | | |
| H | Polymeric fat acid | 57 | 4.6 | 84.8 | 212 |
|   | Sebacic acid | 43 | | | |
|   | Hexamethylene diamine | 100 | | | |
| I | Polymeric fat acid | 29 | 14.1 | 55.0 | 224 |
|   | Azelaic acid | 71 | | | |
|   | Hexamethylene diamine | 100 | | | |
| J | Polymeric fat acid | 43 | 18.3 | 22.3 | 208 |
|   | Azelaic acid | 57 | | | |
|   | Hexamethylene diamine | 100 | | | |
| K | Polymeric fat acid | 55 | 3.6 | 66.6 | 209 |
|   | Azelaic acid | 45 | | | |
|   | Hexamethylene diamine | 100 | | | |

The polymeric fat acid used in preparing the above polyamides was essentially the same in all cases varying only slightly in % monomer (M), intermediate (I), dimer (D) and trimer (T) in the following ranges (M--1.0–1.8%; I--2.6–5.4%; D--92.6–94.6%; and T--0.9–2.5%).

The cross-linkable polyamides of the present invention are prepared by reacting formaldehyde with the starting polyamide under anhydrous conditions and in the presence of an alcohol and a catalyst. The anhydrous formaldehyde reactant is conveniently obtained by dissolving paraformaldehyde in the alcohol with the aid of a small amount of sodium hydroxide. The starting polyamide is preferably dissolved in an organic solvent therefor and then such solution is added or mixed with the formaldehyde solution. Representative organic solvents for the polyamide are aliphatic alcohols, chloroform, chloroethanes, toluene and the like including mixtures. The combined reaction solution is then preferably heated to reflux and the acid catalyst is added thereto. Anhydrous acetic acid is the preferred catalyst. Other useful catalysts are formic acid, phosphoric acid, trifluoroacetic acid, chloroacetic acid and the like. The catalyzed reaction mixture is then heated in a first stage for a sufficient length of time to obtain the degree of substitution desired. Normally an excess of the formaldehyde is used and thus the degree of substitution is primarily dependent upon the reaction temperature and time of reaction. Reaction times of from about 1/2 hour to 50 hours or more for the first stage have given good results, it being understood that the reaction time varies somewhat with the specific reactants and ratios and the reaction temperature. After completion of the first stage, additional alcohol is added and the reaction mixture is again preferably refluxed. In the first stage, the formaldehyde condenses with the amide groups,

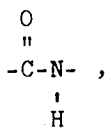

of the polyamide to yield

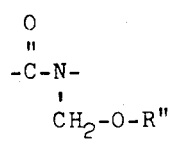

groups where R is the hydrocarbon group of the alcohol. However, some ester groups are also formed due to the presence of the acid catalyst--i.e.

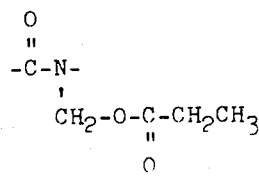

as when acetic acid is used. The additional quantity of alcohol added in the second stage forces the replacement by mass action of the said ester groups to the desired ether groups. After the completion of the second stage (again preferably at reflux temperatures and for times preferably of about 1/2 hour to 50 hours or more), the hot reaction mixture is poured into a mixture of ice and ammonia. The ammonia serves to neutralize the acid catalyst. The organic layer is separated from the aqueous layer and then washed with water to remove inorganic and organic salts and excess formaldehyde. The cross-linkable polyamide is then preferably obtained by the addition of acetone which causes the polymer to precipitate. The acetone also dries the polymer.

The reaction is carried out such that the polyamide is rendered cross-linkable through the obtaining of the indicated

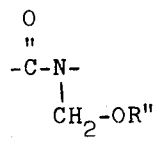

groups. The polyamide will be cross-linkable when above about 10% of the

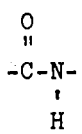

groups of the polymer chain are converted to

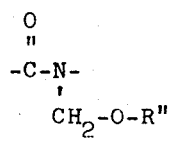

groups. Where the product is to be self cross-linked, the degree of substitution should be less than about 90% since the self cross-linking occurs between the remaining

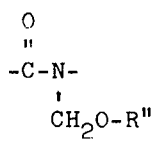

groups and the

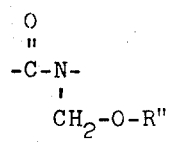

groups--i.e.

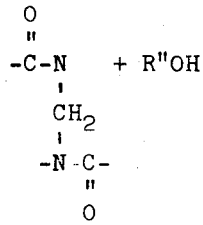

However, completely substituted products are within the scope of the invention since they can be used for reaction with other materials containing groups reactive with the

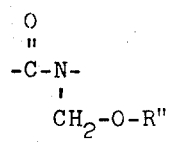

groups.

In the preferred aspects of the invention, the polyamide is rendered both cross-linkable and tacky by the

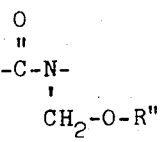

groups. Obtaining of tack is primarily due to the degree of substitution and the melting point of the starting polyamide. The

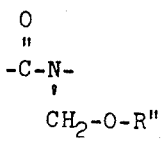

groups tend to lower the melting point of the product to the stage where the product will have discernable tack at ambient room temperature. However, where the starting polyamide has a melting point which is high, even 80% and above substitution will not lower the same to the tacky stage. Thus, where tack is desired, the starting polyamides preferably have melting points below about 180°C. (Ball and Ring Melting Point). With such polyamides, the degree of substitution will be above about 45% and less than about 90% (to retain self cross-linking properties). Again the precise degree of substitution of

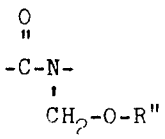

groups for

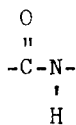

groups to obtain tack will vary somewhat for each particular starting polyamide. It is here noted that the % substitution of the amide hydrogen by the —CH$_2$—O—R'' radical is estimated by the use of an infrared spectroscopic method which utilizes ratios of characteristic resin absorbance bands.

The alcohols useful in the described reaction are those containing less than about 12 carbon atoms. Thus R'' is an organic radical containing 12 or less carbon atoms. Representative alcohols are methanol, ethanol, isopropanol, n-butanol, octanol, decanol, isodecanol, benzyl alcohol and the like. Preferred such alcohols are the aliphatic alcohols containing less than about four carbon atoms. Methanol is especially preferred since the resulting cross-linkable polyamides have more controllable cross-linking rates which is desired when the products are to be used in fabric bonding. While R'' may contain inert substituents (i.e. Cl, ether and the like), it is also preferred that the same is unsubstituted hydrocarbon.

The cross-linkable polyamides derived from polymeric fat acids of the invention are useful as coatings and adhesives for a variety of substrates and particularly as thermosetting adhesives for fabrics. A thin film of the products can be layed down on the substrate to be coated and then the thin film is cured. Such film can be layed down from a solvent solution of the product. Additionally, a film can be layed down on a release surface and then transferred prior to curing for coating or bonding purposes to the substrate or substrates to be coated or bonded. Film thicknesses of from about 2 to 10 mils are especially suitable for fabric bonding purposes (each mil thickness comprises approximately 15 mg. product per square inch).

In the absence of an acid catalyst, the cross-linkable polyamides of the invention are very stable. Thus to effect cure, such catalyst is added to the product. Cure of the catalyst containing polyamide is accelerated with heat. Additionally, as the chain length of R'' is increased, the rate of the catalyzed cure increases. A variety of acids and acid precursors (i.e. release acids such as heated) can be used. Representative of such catalysts are citric acid, maleic acid, p-toluene sulfonic acid, anilinium chloride and the like.

The following examples illustrate preferred embodiments of the invention without being limiting.

EXAMPLE I

Paraformaldehyde (305 g.) was solubilized in 320 g. methanol with the aid of one pellet sodium hydroxide. Chloroform (750 g.) was added to 554 g. of the formaldehydemethanol solution. The polyamide of Example A was then dissolved in this solution. After the reaction mixture was heated to reflux temperature (about 80°C.), 720 g. glacial acetic acid was added. In the first stage, the resulting catalyzed reaction mixture was heated at reflux for 45 minutes. Then 254 g. methanol was added and heating at reflux was continued for an additional 18 hours. The solution was poured into a bath consisting of 720 ml. concentrated ammonium hydroxide to neutralize the acid and 1700 g. ice to cool the mixture. The aqueous layer was decanted and the organic layer washed three times with three liters of water. Three and one-half liters of acetone were then added and the product precipitated. The solvents were removed by decantation and the product was taken up in 750 ml. chloroform. The solution was washed with three 3 l. quantities of water to remove residual traces of acid salts and formaldehyde. The product was again obtained by precipitation by the addition of 3.5 l. acetone. The semi-fluid precipitate was dried overnight in a vac-oven at room temperature. The product so obtained was tacky to the touch. A comparison of the I.R. spectra of the product and the starting polyamide gave an estimate that 53% of the amide hydrogens had been replaced by —CH$_2$—O—CH$_3$ groups.

EXAMPLE II

Example I was repeated except heating in the first stage was for 1 ½ hours and in the second stage was 5 hours. The product was extremely sticky to the touch and I.R. analysis revealed approximately 76% substitution of —CH$_2$—O—CH$_3$ groups for amide hydrogen.

EXAMPLE III

Example I was repeated except heating in the first stage was for 25 minutes and in the second stage was 1 hour. The product, although it exhibited cohesion to pieces of itself, had little tack to the touch. I.R. analysis revealed approximately 48% substitution of —CH$_2$—O—CH$_3$ groups for amide hydrogen.

EXAMPLE IV

Example I was essentially repeated except that:
(1) the first stage refluxing was for 1½ hours and the second stage reluxing was for 2 hours; (2) polyamides which were the same as that of Example A were used but slight excesses of amine or acid were used in their preparation to control the end groups; and (3) the following quantities of reactants were used:

| | Equivalents | Amount |
|---|---|---|
| Polyamide | 0.10 | 32.4 g. |
| Paraformaldehyde | 1.00 | 30.5 g. |
| Methanol (1st stage) | 1.00 | 32.0 g. |
| Chloroform | — | 80 ml. |
| Glacial acetic acid | 1.50 | 80 ml. |
| Methanol (2nd stage) | 1.00 | 40 ml. |
| Ammonium hydroxide (conc.) | — | 110 ml. |

Properties of the starting polyamides and the results of the substitution reaction are set forth in the following table:

tended to coat the finger with a gooey mass that was not easily and cleanly removed.

EXAMPLE V

Example IV was essentially repeated except that the starting polyamides had further variation in acid and amine termination and the substitution reaction was controlled (1st stage heating period) to give varying degrees of substitution. Properties of the starting polyamides and various test results on the products of the invention are set forth in the following table:

Table II

| Poly-amide | Properties of Starting Polyamide | | | | Product Properties | | Cured Product Properties | | | | | |
|---|---|---|---|---|---|---|---|---|---|---|---|---|
| | In-[1]herent Viscosity | Ball & Ring Melting Point °C. | End Group Analysis (Meq./Kg.) | | % Substitution (I.R. Analysis) | 24 Hr.[2] Tack max (g./in.) | Peel[3] (lb./in.) | | Ulti-[4]mate Tensile Strength psi | % Elon-[5]gation | 2% Tensile[6] Modulus (psi) | | |
| | | | Acid Value | Amine Value | | | 325°F. | 400°F. | | | 1 Day | 1 Week | 1 Month |
| 1 | .451 | 117 | 35.2 | 2.7 | 38 | 0 | 11.6 | 7.5 | 1,362 | 175 | 1,398 | 2,397 | — |
| " | .451 | 117 | " | " | 53.5 | 0 | 12.9 | 13.3 | 1,083 | 137 | 1,326 | 2,709 | 2,214 |
| " | .451 | 117 | " | " | 58.2 | 33 | 12.8 | 11.7 | 829 | 115 | 1,160 | 1,536 | 2,677 |
| " | .451 | 117 | " | " | 63 | 147 | 11.4 | 12.2 | 748 | 116 | 1,252 | 1,547 | 1,341 |
| " | .451 | 117 | " | " | 70 | 736 | 11.8 | 10.3 | 790 | 110 | 2,263 | 2,583 | 4,156 |
| " | .451 | 117 | " | " | 82.5 | 319 | 6.7 | 9.1 | 447 | 68 | 838 | 1,024 | 796 |
| 2 | .646 | 150 | 7.1 | 10.8 | 60 | 29 | 12.3 | 8.0 | 701 | 127 | 633 | 606 | 532 |
| " | .646 | 150 | " | " | 62.2 | 45 | 10.3 | 7.5 | 966 | 121 | 579 | 726 | 882 |
| " | .646 | 150 | " | " | 70.2 | 107 | 11.8 | 9.8 | 494 | 125 | 491 | 470 | 378 |
| 3 | .614 | 148 | 4.8 | 27.9 | 62.4 | 93 | 12.6 | 9.6 | 961 | 165 | 568 | 618 | 591 |
| " | .614 | 146 | " | " | 70 | 37 | 6.7 | 5.4 | 531 | 131 | 585 | 613 | 493 |
| 4 | .446 | 116 | 15.9 | 11.3 | 69 | 529 | 13.2 | 12.9 | 326 | 82 | 619 | 454 | 479 |
| " | .446 | 116 | " | " | 66 | 616 | 12.2 | 13.3 | 491 | 93 | 667 | 590 | 595 |
| " | .446 | 116 | " | " | 71.2 | 332 | 14.4 | 13.8 | 444 | 89 | 698 | 536 | 558 |
| 5 | .477 | 121 | 40.0 | 26.5 | 72 | 617 | 11.6 | 11.3 | 831 | 104 | 732 | 1,396 | 1,118 |
| 6 | .515 | 132 | 15.2 | 5.5 | 69 | 297 | 11.6 | 12.3 | 769 | 57 | 833 | 1,075 | 1,154 |
| 7 | .566 | 135 | 5.9 | 19.8 | 56 | 47 | 10.8 | 9.7 | 891 | 118 | 683 | 1,633 | 1,875 |
| " | .566 | 135 | " | " | 72.2 | 132 | 6.3 | 8.1 | 316 | 87 | 466 | 559[7] | 482 |
| 8 | .573 | 136 | 14.5 | 18.5 | 56 | 25 | 13.5 | 10.8 | 910 | 116 | 786 | 1,090 | 905 |
| " | .573 | 136 | " | " | 67.5 | 67 | 13.6 | 9.4 | 583 | 107 | 707 | 714 | 738 |

[1]As in Table I.
[2]Two inch strip of product cast as 5–7 mil film on a film Mylar. The coated Mylar is then cut into 1¼ inch wide strips such that the resultant resin surface is 1¼ by 2 inches. The twill side of a 1 by 3 inch strip of thin fabric (dacron/cotton, 65/35) is placed on the top of product side of the coated Mylar strip and then a 1 by 1 inch metal block weighing 1 lb. is exactly placed on the laminate for one minute. The force in grams/inch to pull the fabric from the product is then measured.
[3]Peel measured on bonding pieces of fabric (same as in [2] ) with a ≅ 50–80 mg./in.² film of product containing 65 parts by weight citric acid per 1000 parts product at indicated temperatures for 1½ minutes using a carefully controlled laboratory iron with 0.5 psi pressure.
[4] – [6]ASTM D 638 modified for use on micro specimens to give relative tensile strength and modulus values. Elongation % is length of stretched specimen at point of break divided by original length times 100.
[7]2 week value Table I

| Poly-amide | Inherent* Viscosity | End Group Analysis (Meq./Kg.) | | Estimated Mol Wt. | % Amide Hydrogens Replaced (I.R. Analysis) |
|---|---|---|---|---|---|
| | | Acid Value | Amine Value | | |
| 1 | .622 | 19.2 | 2.0 | 24,000 | 73 |
| 2 | .505 | 5.8 | 21.1 | 16,000 | 62 |
| 3 | .340 | 73.3 | 7.6 | 8,000 | 68 |
| 4 | .669 | 9.1 | 12.1 | 30,000 | 66 |

*Measured as 0.5% by wt. solution in o-chlorophenol at 30°C.

The above data show that the starting polyamides with more amine than acid termination had a lower per cent substitution. Molecular weight effects were not great. Additionally, the products obtained from the more acid terminated polyamides seemed to have a larger cohesive strength. When touched with a finger, they stuck but could be pulled off. The products obtained from the more amine terminated polyamides

EXAMPLE VI

Paraformaldehyde (61 g.) was solubilized in 120 g. isopropyl alcohol with the aid of 0.1 g. sodium hydroxide. Thirty-two g. of the polyamide of Example A and 65 ml. chloroform were added and mixed with 100 g. of the formaldehyde-isopropanol solution as in Example I. The reaction mixture was heated to reflux and 85 ml. glacial acetic acid was added. Heating at reflux in the first stage was continued for one hour and then 58 g. isopropyl alcohol was added. Heating at reflux after the alcohol addition was for three hours. Then the reaction was quenched and worked by similarly as in Example I. The very tacky product was estimated by I.R. to be 80% substituted with

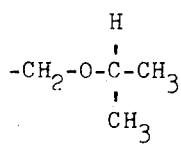

groups as replacements for amide hydrogens.

EXAMPLE VII

Example VI was essentially repeated using: 61 g. paraformaldehyde, 148 g. n-butanol, 0.1 g. sodium hydroxide, 32 g. of the polyamide of Example A, 65 ml. chloroform, 85 ml. glacial acetic acid, and 73 g. n-butanol in the second stage. The extremely tacky product was estimated by infrared to be 78% substituted with $-CH_2-O-(CH_2)_3CH_3$ groups as replacements for amide hydrogen.

EXAMPLE VIII

Example VI was essentially repeated using: 60 g. paraformaldehyde, 216 g. benzyl alcohol, 0.1 g. sodium hydroxide, 32 g. of the polyamide of Example A, 65 ml. chloroform, 85 ml. glacial acetic acid, and 106 g. benzyl alcohol in the second stage. The very tacky adhesive was estimated by infrared to be 82% substituted with

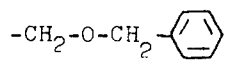

groups as replacements for amide hydrogen.

EXAMPLE IX

Example VI was essentially repeated using: 30.5 g. paraformaldehyde, 158 g. isodecyl alcohol, 1 pellet sodium hydroxide, 90 ml. chloroform, 32.4 g. of the polyamide of the Example A, 85 ml. glacial acetic acid and 190 ml. isodecyl alcohol in the second stage. The reaction mixture was heated at reflux for 18 hours in the first stage and two hours in the second stage. The tacky adhesive was estimated by infrared to be 74% substituted with $-CH_2-O-C_{10}H_{21}$ groups as replacements for amide hydrogens.

EXAMPLE X

Example IX was essentially repeated using: 30.5 g. paraformaldehyde, 76.1 g. 2-methoxyethanol, 1 pellet sodium hydroxide, 90 ml. chloroform, 3204 g. of the polyamide of Example A, 85 ml. glacial acetic acid, and 79 ml. 2-methoxymethanol in the second stage. The reaction mixture was refluxed for one hour in both stages. The tacky adhesive was estimated by infrared to be 72% substituted with $-CH_2-O-CH_2CH_2-O-CH_3$ groups as replacements for amide hydrogens.

EXAMPLE XI

Example X was repeated except that the first stage heating was for 5¾ hours. An estimated 80% substitution was obtained.

EXAMPLE XII

Example X was repeated except that ethylene chlorohydrin (80.5 g. in both stages) was used in place of the 2-methoxyethanol. The tacky adhesive was estimated by infrared to be 85% substituted with $-CH_2-O-CH_2CH_2Cl$ groups as replacements for amide hydrogens.

Fifty-four g. of the paraformaldehyde-methanol solution of Example I was mixed with a solution of 23 g. of the polyamide of Example B in 89 g. glacial acetic acid. The resulting reaction mixture was heated at reflux for 10 minutes. 24 g. methanol added and then refluxing was continued for an additional 30 minutes. The reaction was quenched in a mixture of 90 ml. conc. ammonium hydroxide and 200 g. ice. The aqueous layer was decanted and the organic layer washed three times with 600 ml. quantities of water. The product was precipitated with 600 ml. acetone and dried overnight in a vacuum oven. The extremely sticky methoxymethyl substituted polyamide was estimated by infrared analysis to be 67% substituted.

EXAMPLE XIV

Example I was essentially repeated except: (1) the first stage heating for one hour and the second stage heating was for three hours; and (2) the quantities and types of reactants were as follows--69 g. of the paraformaldehydemethanol solution, 29 g. of the polyamide in Example C, 94 g. chloroform, 90 g. glacial acetic acid, 32 g. methanol in the second stage, 90 ml. conc. ammonium hydroxide, 600 ml. for the water washes, and 750 ml. acetone to precipitate the product. Analysis by infrared revealed the lightly tacky material to be approximately 61% substituted with methoxymethyl groups as replacement for amide hydrogens.

EXAMPLE XV

To a Parr bomb was charged 87.4 g. of the polyamide of EXample C, 11.25 g. paraformaldehyde and 1.9 g. 85% phosphoric acid mixed with 24.0 g. methanol. The reaction mixture was heated and stirred between 115° and 130°C. for approximately 30 minutes and then cooled to about 50°C. A mixture of 45 g. chloroform, 50 g. methanol and 12 g. conc. ammonium hydroxide was added and the whole reaction mixture allowed to stir at 50°C. for about one more hour. The mixture was then forced out of the bomb with a nitrogen flow with the aid of an additional 225 g. chloroform and 25 g. methanol. The product was precipitated by adding 500 ml. of a 50:50 acetone-H$_2$O mixture. The excess solvent was decanted off, the product washed with cold water and then dried overnight in a vacuum oven. Infrared analysis revealed an estimated 12% methoxymethyl substitution for the non-tacky product. Heating of strips of the product (cast from a 10% by weight solution in chloroform containing 2% by weight of the product of p-toluene sulfonic acid) at temperatures of 130°-150°C. for 10 minutes showed that crosslinking increased with increasing temperature. The crosslinked product became infusible and insoluble.

EXAMPLE XVI

Example I was essentially repeated except that: (1) first stage heating was for 2½ hours and second stage heating was for 18 hours; and (2) the quantities of reactants were as follows--54 g. of the paraformaldehyde-methanol solution, 38 g. of the polyamide of Example D, 91 g. chloroform, 90 g. glacial acetic acid, 24 g. methanol in the second stage, 90 ml. conc. ammonium hydroxide, 600 ml. for the water washes and 750 ml. acetone to precipitate the product. The hard, solid product was estimated by infrared analysis to be 18% substituted with methoxymethyl groups as replacements for amide hydrogens.

EXAMPLE XVII

Example XVI was essentially repeated except 45 g. trifluoroacetic acid were used in place of acetic acid as the catalyst, first stage heating was for six hours and second stage heating was for 18 hours. The hard, brittle product had an estimated 84% methoxymethyl substitution by infrared analysis.

EXAMPLE XVIII

Example XVI was essentially repeated except that: (1) first stage heating was for six hours and second stage heating was for 16 hours; and (2) the quantities and types of reactants were as follows--62 g. of the paraformaldehydemethanol solution, 40 g. of the polyamide of Example E, 125 ml. chloroform, and 62 g. methanol in the second stage. The hard product had an estimated methoxymethyl substitution of 23% as measured by infrared.

EXAMPLE XIX

Example XVI was essentially repeated except first stage heating was for five hours, second stage heating was for 16½ hours and 34 g. of the polyamide of Example F were used instead of the polyamide of Example D. The non-tacky solid product was estimated by I.R. analysis to be 25% substituted with methoxymethyl groups as replacements for the amido hydrogens.

EXAMPLE XX

Example XVI was essentially repeated except that: (1) the first stage heating was for 52 hours and the second stage heating was for 16 hours; and (2) the quantities and types of reactants were as follows--30 g. of the polyamide of Example F, 300 ml. 1,1,2-trichloroethane, 100 g. of the paraformaldehydeisopropanol solution of Example VI, 258 g. dichloroacetic acid, 60 g. isopropanol in the second step and 100 ml. conc. ammonium hydroxide. The crumbly product had an estimated 55% isopropoxymethyl substitution by infrared analysis.

EXAMPLE XXI

Example XVI was essentially repeated except that: (1) the first stage heating was for 24 hours and the second stage heating was for 174 hours; and (2) the quantities and types of reactants were as follows--62 g. of the paraformaldehydemethanol solution, 28 g. of the polyamide of Example G, 100 ml. chloroform, 105 g. glacial acetic acid and 35 g. methanol in the second stage. The non-sticky powdery product had an I.R. estimated 60% substitution or methoxymethyl groups.

EXAMPLE XXII

Example XVI was essentially repeated except first stage heating was for six hours, second stage heating was for 18 hours and the polyamide was that of Example H with 29.4 g. thereof being used with 100 ml. chloroform. The sticky product had an estimated 70% methoxymethyl substitution by I.R. analysis.

EXAMPLE XXIII

Example XVI was essentially repeated except first stage heating was for seven hours, second stage heating was for one hour and the polyamide was that of Example I with 23 g. thereof being used with 100 ml. chloroform. The solid product had an estimated methoxymethyl substitution of 72% by infrared analysis.

EXAMPLE XXIV

Example XVI was essentially repeated except that: (1) the first stage heating was for 40 hours and the second stage heating was for eight hours; and (2) the quantities and types of reactants were as follows--62 g. of the paraformaldehydemethanol solution, 26 g. of the polyamide of Example J, 100 ml. chloroform, 100 ml. glacial acetic acid, 40 ml. methanol in the second stage and 120 ml. conc. ammonium hydroxide. The product was slightly sticky and had an estimated 58% methoxymethyl substitution by I.R. analysis.

EXAMPLE XXV

Example XVI was essentially repeated except first stage heating was for two hours, second stage heating was for three hours and the polyamide was that of Example K with 29 g. thereof being used with 100 ml. chloroform. The product was sticky and had an infrared estimated analysis of 48% methoxymethyl substitution.

EXAMPLE XXVI

Example XVI was essentially repeated except first stage heating was for one hour, second stage heating was for three hours, 48 g. formic acid were used as the catalyst in place of the acetic acid and the polyamide was that of Example A with 32 g. thereof being used. The product was slightly sticky to the touch and had an estimated 56% methoxymethyl substitution by I.R. analysis.

EXAMPLE XXVII

Example XXVI was essentially repeated except that 18 g. acetic acid were used in place of formic acid and the reaction mixture was charged into a pressure bomb and run at and 70 pisg. The first stage was run for ½ hour and the second stage was run for 1½ hours. The slightly tacky polymer had an estimated substitution of 59% by I.R. analysis.

EXAMPLE XXVIII

Thirty grams of product prepared according to the method of Example II and having an estimated substitution of 79% were dissolved in 100 ml. of 4:1 chloroform:methanol (wt.:wt. basis). Half of the solution was heated to 50°C. after which 100 ml. 1 N aqueous $Na_2SO_3$ were added to remove N-methylol groups if they were present on the product. The two phase system was mixed at 50°C. for 10 minutes and then the aqueous layer was decanted. The thus treated one half portion and the untreated one half portion of the product solution were each washed four times with 200 ml. water to remove inorganic salts. The product was precipitated by the addition of acetone and dried overnight in a vacuum oven. The untreated sample showed 82% substitution and the treated sample showed 81¼% substitution. As a result, it was concluded that no N-methylol substituents were present in the product.

EXAMPLE XXIX

Twenty g. of the product of Example II were dissolved in a solution of 56 g. chloroform and 4 g. methanol to form Solution 1. Solution 2 were prepared by the dissolution of 5 g. citric acid in 20 g. methanol and 75 g. chloroform. Solution 3 was prepared by the dissolution of 5 g. maleic acid in 20 g. methanol and 75 g. chloroform.

Twenty g. of Solution 1 was mixed with 5 g. Solution 2 and cast onto Teflon impregnated fiber glass fabric using a 50 mil doctor blade. The resulting 8–10 mil film (after solvent evaporation) had a yield strength of 7 psi, an ultimate tensile strength of 1 psi, an elongation of 1600% and a 2% tensile modulus of 0.0 when uncured. But when cured to an offset yield strength (300°F. for 10 minutes), the crosslinked product had an ultimate tensile strength of 1000 psi, an elongation of 170% and a 2% tensile modulus of 670 psi.

Similarly a cured film as above prepared but using 5 g. Solution 3 had an ultimate tensile strength of 750 psi, an elongation of 110% and 2% tensile modulus of 860 psi.

EXAMPLE XXX

The products of Examples I and II were cast out of chloroform-methanol solutions onto Mylar to yield five mil films after solvent evaporation. The tack of the film was measured at room temperature ($\approx 25°C$.). The coated Mylar was cut into one inch wide strips and lightweight cotton (100% cotton twill), also cut one inch wide, was placed on top of the coated Mylar. A weight (¼, ½ or 1 lb.) with one square inch of surface area was placed on the various laminates for a specific dwell time. The laminates were then peeled on an Instron Tensile Tester. Results are set forth in the following table:

Table III

| Dwell Time (sec.) | Pressure (psi) | Peel Strength (g./in.) Product of Example I | Product of Example II |
|---|---|---|---|
| 15 | ¼ | 90 | 670 |
| 15 | ½ | 90 | 680 |
| 15 | 1 | 140 | 750 |
| 30 | ¼ | 80 | 700 |
| 30 | ½ | 180 | 730 |
| 30 | 1 | 260 | 770 |
| 60 | ¼ | 120 | 720 |
| 60 | ½ | 290 | 750 |
| 60 | 1 | 710 | 820 |

EXAMPLE XXXI

The product of Example I was cast into films as described in Example XXIX, with the films being 6–8 mils thick. One set of film contained the cross-linkable product with 5 wt. % citric acid and one contained the cross-linkable product with 5 wt. % maleic acid. Strips of these films were used for zipper in-letting, i.e. 50:50 polyester cotton twill zipper material was bonded to 65:35 polyester-cotton dress material. A force of 18 lbs. was applied to the bonds with a steaming home flat iron set at 325°F. Results are set forth in the following Table:

Table IV

| Dwell Time (sec.) | Peel Strength (lb./in.) Cured Product Using Citric Acid | Cured Product Using Maleic Acid |
|---|---|---|
| 15 | 6.2 | 5.4 |
| 30 | 7.6 | 5.4 |
| 60 | 8.7 | 5.7 |
| 120 | — | 6.6 |

EXAMPLE XXXII

Films were cast as in Example XXV except that the product had a degree of substitution of 69% as estimated by I.R. analysis and various acid catalysts were used at varying levels. Fabric bonds were made with 100% cotton twill with a steaming home iron set at 325°F. (a force of 18 lbs. was used). Results are set forth in the following Table:

Table V

| Dwell Time (sec.) | Peel Strength (lb./in.) Cured Products Using | | | | | |
|---|---|---|---|---|---|---|
| | Citric Acid | | | Phthalic Acid | | Malonic Acid |
| | 2% | 5% | 10% | 2% | 5% | 2% | 5% |
| 15 | 2.9 | 4.3 | 7.6 | 2.9 | 4.0 | 1.5 | 4.5 |
| 30 | 2.7 | 5.8 | 10.6 | 2.6 | 5.0 | 2.1 | 3.3 |
| 60 | 2.9 | 8.2 | 12.8 | 4.2 | 9.5 | 1.7 | 5.5 |
| 120 | 5.4 | 11.9 | 13.9 | 8.0 | 12.0 | 0.8 | 6.8 |

As indicated above, the tacky cross-linkable products of the present invention find special use for the inletting of zippers and bonding of fabrics generally. Thus sticky or tacky films of the products are applied at the edges of the "right" side of the zipper. Since the adhesive is tacky, the zipper can be positioned into the garment with pressure from the fingers. The tack is strong enough so that the garment can be handled to determine whether the zipper is properly positioned. If not, the zipper and adhesive can be easily peeled off and reapplied to the garment. When the zipper is properly positioned, heat is applied from a steaming iron to cure the catalyzed product. After the cure, the garment and adhesive bond are launderable and dry-cleanable. The same procedure can be used with appliques and decorator trims such as lace, ricrac, etc. Additionally, any seams of garments and other cloth articles can be temporarily positioned and then finally cured and bonded with the products of the invention.

The products of the invention also find use as adhesives for shoe soles and shoe uppers. The tacky products allow the positioning of the sole on the shoe. When the alignment is correct, the products are cured to provide permanent bonds. The tacky products also find use in the application of gaskets and weather stripping. Thus, they can be applied to cork, rubber sponge, etc. and, then when the coated product is properly positioned, the adhesive can be cured by application of heat or at longer times at room temperature.

Also as indicated above, the cross-linkable products can be used to bond or coat a wide variety of other substrates including metal, paper, wood etc. Where positioning and repositioning is not a problem, the products can be either tacky or non-tacky.

The embodiments of the invention in which an exclusive property or privilege is claimed are defined as follows:

1. A cross-linkable polyamide derived from an essentially linear diamine-polymeric fat acid based polyamide wherein the polymeric fat acid comprises at least about 25 equivalent % of the total carboxyl groups of the acid component used in the preparation of the polyamide and contains at least about 85% dimeric fat acid obtained by polymerizing ethylenically unsaturated aliphatic monocarboxylic acids of 16 to 22 carbon atoms, said cross-linkable polyamide having sufficient —CH- $_2$—O—R'' groups, wherein R'' is a hydrocarbon radical of less than about 12 carbon atoms which may contain inert substituents, as replacements for amide hydrogens of the essentially linear polyamide to render the same cross-linkable.

2. The cross-linkable polyamide of claim 1 wherein 100 equivalent % of the total carboxyl groups of the acid component in the preparation of the polyamide is from the polymeric fat acid.

3. The cross-linkable polyamide of claim 1 wherein 75 to 0 equivalent % of the total carboxyl groups of the acid component used in the preparation of the polyamide is from a copolymerizing diacid of 2 to 20 carbon atoms.

4. The cross-linkable polyamide of claim 3 wherein the copolymerizing diacid is an aliphatic dicarboxylic acid of 6–12 carbon atoms.

5. The cross-linkable polyamide of claim 1 wherein the diamine contains from 2 to 44 carbon atoms.

6. The cross-linkable polyamide of claim 5 wherein the diamine component comprises a substantial proportion of hexamethylene diamine.

7. The cross-linkable polyamide of claim 2 wherein the diamine is hexamethylene diamine.

8. The cross-linkable polyamide of claim 1 wherein the diamine and acid component are used in essentially equivalent amounts.

9. The cross-linkable polyamide of claim 1 wherein the essentially linear polyamide is primarily acid terminated.

10. The cross-linkable polyamide of claim 1 wherein the essentially linear polyamide has a ball and ring melting point of less than about 180°C.

11. The cross-linkable polyamide of claim 1 wherein at least about 10% of the amide hydrogens of the essentially linear polyamide are replaced with the —CH$_2$—O—R'' groups.

12. The cross-linkable polyamide of claim 1 wherein less than about 90% of the amide hydrogens of the essentially linear polyamide are replaced with the —CH$_2$—O—R'' groups.

13. The cross-linkable polyamide of claim 1 wherein from about 45–90% of the amide hydrogens of the essentially linear polyamide are replaced with the —CH$_2$—O—R'' groups.

14. The cross-linkable polyamide of claim 1 wherein R'' is an unsubstituted hydrocarbon group.

15. The cross-linkable polyamide of claim 14 wherein R'' is an aliphatic hydrocarbon group of less than about four carbon atoms.

16. The cross-linkable polyamide of claim 15 wherein R'' is methyl.

17. The cross-linkable polyamide of claim 1 wherein the diamine is hexamethylene diamine, 100 equivalent % of the total carboxyl groups of the acid component used in the preparation of the polyamide is from the polymeric fat acid, the hexamethylene diamine and polymeric fat acid are used in essentially equivalent amounts, the essentially linear polyamide has a ball and ring melting point of less than about 180°C. and is primarily acid terminated, R'' is methyl and sufficient amide hydrogens of the essentially linear polyamide are replaced with —CH$_2$—O—CH$_3$ groups to render the same both cross-linkable and tacky.

* * * * *

UNITED STATES PATENT OFFICE
CERTIFICATE OF CORRECTION

PATENT NO. : 3,892,785
DATED : July 1, 1975
INVENTOR(S) : James E. Billigmeier, Allan L. Melby, Dwight E. Peerman and Richard R. Roesler It is certified that error appears in the above-identified patent and that said Letters Patent are hereby corrected as shown below:

Col. 2, line 28, "formation or" should read --formation of--. Col. 3, line 56 "from the distill-" should read --from that distill- --. Col. 4, line 1, "fat acids value" should read --fat acid value--; line 17, "above period" should read --above percent--; line 43, "cycloaliphatic aromatic" should read --cycloaliphatic or aromatic--; line 60, "mately cross-linkable" should read --mately prepared cross-linkable--. Col. 5, line 9, "is aliphatic" should read --is an aliphatic--. Col. 10, line 8, "as heated" should read --as when heated--; line 63, "reluxing" should read --refluxing--.
Column , 12, line 65, "by" should read --up--. Col. 13, line 48, "3204 g." should read --32.4 g.--. Col. 14, line 1, add --EXAMPLE XIII--; line 18, "heating for" should read --heating was for--; line 21, "polyamide in" should read --polyamide of--. Col. 15, line 28, "amido" should read --amide--; line 53, "or" should read --of--.
Column, 16, line 66, "were" should read --was--.

Col. 17, line 22, "film" should read --films--. Col. 19, line 8, "component in" should read --component used in--.

Signed and Sealed this sixteenth Day of December 1975

[SEAL]

Attest:

RUTH C. MASON
Attesting Officer

C. MARSHALL DANN
Commissioner of Patents and Trademarks